United States Patent [19]

Hulbert

[11] Patent Number: 5,483,550
[45] Date of Patent: Jan. 9, 1996

[54] MOBILE CELLULAR RADIO SYSTEMS

[75] Inventor: Anthony P. Hulbert, Shirley, England

[73] Assignee: Roke Manor Research Limited, Hampshire, England

[21] Appl. No.: 196,120

[22] PCT Filed: Jul. 26, 1993

[86] PCT No.: PCT/GB93/01577

§ 371 Date: Feb. 16, 1994

§ 102(e) Date: Feb. 16, 1994

[87] PCT Pub. No.: WO94/02996

PCT Pub. Date: Feb. 3, 1994

[30] Foreign Application Priority Data

Jul. 24, 1992 [GB] United Kingdom .................. 9215773

[51] Int. Cl.⁶ .................................................. H04B 1/713
[52] U.S. Cl. .......................................... 375/202; 375/205
[58] Field of Search ................................ 375/1, 202, 205; 370/95.1

[56] References Cited

U.S. PATENT DOCUMENTS

| | | | |
|---|---|---|---|
| 4,189,677 | 2/1980 | Cooper et al. | 375/1 |
| 4,355,399 | 10/1982 | Timor | 375/1 |
| 4,866,710 | 9/1989 | Schaeffer | 370/95.1 |
| 5,210,770 | 5/1993 | Rice | 375/1 |
| 5,216,692 | 6/1993 | Ling | 375/1 |
| 5,280,537 | 1/1994 | Sugiyama et al. | 375/1 |
| 5,353,301 | 10/1994 | Mitzlaff | 375/1 |

FOREIGN PATENT DOCUMENTS

0189695A1  12/1985  France .

*Primary Examiner*—Salvatore Cangialosi
*Attorney, Agent, or Firm*—Keck, Mahin & Cate

[57] ABSTRACT

A frequency hopped cellular mobile radio system, comprising a plurality of base stations each affording a cellular region, or cell, within which communication is facilitated with a plurality of mobile units, each of which mobile units is free to move from cell to cell, the system having in combination the following features;

a synchronization system which serves to bring all mobile units within a cell into synchronization, as observed from the base station of that cell, whereby orthogonal frequency hopping between mobile units of the cell is facilitated, frequency hopping between mobile units in different cells being non-orthogonal; an affiliation strategy which tends to constrain each mobile unit to maintain communication with a base station selected in dependence upon received signal strength;

mobile unit transmission power control in dependence upon received signal/noise ratio at a base station, whereby transmitted mobile power tends towards the minimum necessary for acceptable communication;

a frequency hopping strategy, wherein the number of bits per hop is limited to a few bits per hop, the actual number of hops being chosen having regard to performance and overall framing delay constraints;

Nyquist filtering of signals effective to constrain interference between hops both in the time domain and in the frequency domain, hopped dwells being arranged to extend in time beyond a nominal bit transmission period (before and after the period) so as to overlap;

differential phase shift keying (DPSK) modulation combined with randomized quadrature phase shift keyed (QPSK) modulation to de-correlate interference between cells; and, a system of error control coding.

7 Claims, 2 Drawing Sheets

MOBILE CELLULAR RADIO SYSTEMS

This invention relates to mobile cellular radio systems, and more especially it relates to frequency hopped, code division multiple access, (CDMA) Cellular Radio Systems).

Cellular mobile radio systems require increasing spectrum efficiency, which can be defined in terms of bits per Hz of RF bandwidth over all users in a cell per cell. Recent system concepts based on direct sequence spread spectrum CDMA have demonstrated that increased capacity may be achieved through the effect of 'interferer' diversity, wherein every mobile is subject only to the average interference over many users. It has been shown more recently that the use of slow frequency hopped CDMA can, in principle, lead to even higher spectral efficiency through orthogonal hopping, i.e. frequency hopping within a cell wherein the system is adapted to ensure that no two mobile units ever use the same frequency contemporaneously. However, proposals to date have used a form of frequency hopping which requires many bits per hop. This results either in rather poor 'interferer' diversity or in long delays. This arises because the time spent on any particular frequency is rather long so that averaging over many frequencies requires a long frame period.

It is an object of the present invention to provide a frequency hopped cellular radio system affording excellent spectrum efficiency and very low delay characteristics.

According to the present invention a frequency hopped cellular mobile radio system, comprises a plurality of base stations each affording a cellular region, or cell, within which communication is facilitated with a plurality of mobile units, each of which mobile units is free to move from cell to cell, the system having in combination the following features;

a synchronisation system which serves to bring all mobile units within a cell into synchronisation, as observed from the base station of that cell, whereby orthogonal frequency hopping between mobile units of the cell is facilitated, frequency hopping between mobile units in different cells being non-orthogonal;

an affiliation strategy which tends to constrain each mobile unit to maintain communication with a base station selected in dependence upon received signal strength;

mobile unit transmission power control in dependence upon received signal/noise ratio at a base station, whereby transmitted mobile power tends towards the minimum necessary for acceptable communication;

a frequency hopping strategy, wherein the number of bits per hop is limited to a few bits per hop, the actual number of bits being chosen having regard to performance and overall framing delay constraints; Nyquist filtering of signals effective to constrain interference between hops both in the time domain and in the frequency, domain, hopped dwells being arranged to extend in time beyond a nominal bit transmission period (before and after the period) so as to overlap;

differential phase shift keying (DPSK) modulation combined with randomised quadrature phase shift keyed (QPSK) modulation to de-correlate interference between cells; and, a system of error control coding.

Preferably the system of error control coding comprises interleaving, whereby adjacent bits are transmitted in different hops and also comprises a forward error correction coding arrangement.

The DPSK modulation is preferably differential binary phase shift keying (DBPSK) with additional randomised QPSK to de-correlate interference between different cells.

The system may include tie feature of power control in a 'down-link' wherein the power of transmitted base station signals is controlled in dependence upon the signal/noise ratio of signals received from a mobile unit.

The aforesaid 'down-link' power control arrangement may be effected using a spread spectrum pilot which is time division multiplexed with data at a rate of one insertion per hop.

In order to provide for mixed bandwidth services, it is envisaged that some users may be arranged to operate with wider bandwidth hopping, whereby mixed bandwidth services can be provided.

The error control coding may utilise Reed Solomon Coding, which is applied in such a way that one symbol of the Reed Solomon Code corresponds exactly to one hop dwell and as will be appreciated by those skilled in the art, interleaving will not be applied in this case.

According to one contemplated embodiment, a 'down-link' receiver, i.e. the receiver at a base station, may be arranged to apply averaging over the initial bits of a multiple user transmission on the same hop, thereby to obtain a more reliable phase estimate for de-modulation. In this case binary phase shift keying (BPSK) could be used for the 'down-link' with the first bit providing a phase reference for all bits in a given hop.

One aspect of the invention will now be considered with respect to the 'up-link' (mobile to base station link). Mobiles are affiliated to their nearest (in the radio sense) base station and have their power controlled to the minimum necessary to achieve adequate bit error rate performance. N.B. It is not necessary to control the power at a rate sufficient to track fading and this is not always possible since (it is assumed that) the fading conditions are independent from one frequency hop to the next. Feedback timing control is exerted on the mobiles' transmissions, in a manner familiar to those versed in the art, so as to cause all transmissions as received at the base station to be in hop and bit synchronisation. This is necessary to achieve true orthogonality. Every base station uses a frequency hop set of N frequencies. In general this will be a contiguous set although this is not essential. Up to N mobiles may be affiliated simultaneously to each base station. The N frequencies are hopped around the mobiles in a manner familiar to those versed in the art. One possible approach would be to take the set of N frequencies and to randomly scramble their order prior to mapping the mobiles onto the frequencies. Two options (a) or (b) are then possible, which will now be considered.

(a) Cycle all the mobiles around these N frequencies and then perform a new scrambling function N hops later. This has the advantage that every mobile will visit every frequency in N hops thereby maximising 'interferer' diversity. It has the disadvantage however, that, within a frame of N hops, each mobile follows the same other mobile. If that mobile, because of its location, has particularly severe multipath conditions then some orthogonality may be lost. This intra cell interference will apply throughout the frame for the pair of mobiles.

(b) Perform a new random scrambling of all frequencies for every new hop. This has the disadvantage that the hopping for any given mobile is truly random so that it cannot be guaranteed that all frequencies are visited within a frame. This will, to some extent, degrade the order of 'interferer' diversity. However, whilst remaining orthogonal within the cell, which mobile will follow which, is completely random so that freak temporary conditions of partial non-orthogonality will be averaged over all users.

Of course other means of frequency hopping are not discounted. The mobiles in all cells hop in a similar fashion although with different sequences so that although orthogonality is preserved within a cell, so that there is little or no inter cell interference, there is no orthogonality between cells, and so there may be some inter cell interference.

Considering now modulation, because the hop dwells are brief, there is no room for inclusion of a pilot transmission, training sequences, or synchronisation sequence. Accordingly differential modulation only can be considered. The basic preferred modulation is filtered DBPSK (differential binary phase shift keying) although, as we shall see later, there is an additional element of QPSK.

Because the number of bits per hop is small, special attention must be paid to the filtering requirements and in particular, the problem of so-called spectral splatter, which is the phenomenon of spectral broadening, associated with the switching between frequencies. Because of spectral splatter it is not possible to achieve the required efficiency along with adequate suppression of spectral splatter by simply hopping the frequency of an oscillator. It is therefore necessary to provide for the transmission of energy on the hopped frequency beyond (before and after) the nominal hop dwell duration in order to permit the energy to decay in a controlled fashion thereby containing the spectral energy substantially within the hop bandwidth. The use of a finite impulse response implementation of Nyquist filtering provides for signal energy which is present beyond the hop dwell periods, but at zero levels at the sample instants for the transmission which is using the frequency next/last. The normal "square root raised cosine" filtering system provides for identical filtering in the transmitter and receiver to contain the spectrum at source whilst permitting matched filter reception.

Reception of the DPSK signal is performed in a conventional fashion but several enhancements may be incorporated to improve performance, i.e. multi bit detection may be incorporated as hereinafter described; twin antennas may be used and the multi bit detection decision variables combined in a suitable fashion to obtain MAP (Maximum a Posteriori) detection across the two antennas; and, the decision variables may be processed to obtain a suitable metric for error correction decoding later.

The base station receiver for any given mobile will normally receive a frequency hopped signal from 'that mobile' and various hits of interference from mobiles in other base station cells because they are non-orthogonal and may be sometimes on the same frequency as the said 'that mobile'. The affiliation strategy (select strongest base station) ensures that, on average, no interference from any mobile in an adjacent base station will exceed the wanted signal level. However, the random effects of narrow band fading may, for a given hop duration, result in the interference from a mobile using another base station exceeding the wanted signal for the own mobile. As described so far the base station has no way of distinguishing between a strong wanted signal with little interference and the reverse situation. To alleviate this problem it is proposed to apply pseduo random QPSK modulation to every mobile prior to the addition of the DBPSK modulation. In the receiver in the base station the known QPSK modulation is removed prior to DBSPK de-modulation. This random modulation will be different from one base station to another so that when receiving interference as the stronger signal there will be a random 90 degree component which will de-emphasise the unwanted-signal decision variable. This is beneficial for combining over two antennas since it will make it easier for the signal on the better placed antenna to override the signal on the worse placed antenna. Moreover, it will provide for improved soft decision metrics.

Considering now error control, it is fundamental to the system that the effects of poor signal conditions are averaged over the cases of good signal conditions to provide an Overall performance which is acceptable. There are several approaches available, based on forward error correction coding (FEC); namely convolutional codes or Reed Solomon Codes for example. Convolutional codes may be used with an interleaving strategy which spreads out the bits from poor hops amongst good ones. This has the advantage that soft decision information may easily be incorporated, using a Viterbi decoder.

Alternatively, Reed Solomon (RS) Codes may be used, and for the burst size available it is quite practicable to code all of the bits in a single hop into a single RS symbol. In this way burst errors corresponding to single hops may easily be corrected. However, soft decision information is not easily incorporated. One approach might be to rank the overall decision variables for each hop into ascending order and to declare all of the poorest bursts, up to the erasure detection capability of the code as erasures.

Considering the 'down-link', operation of the system is essentially symmetrical with one or two minor variations. Power control is applied on the 'down-link' in such a way as to maintain the minimum necessary signal to interference (signal/mobile) ratio at each of the mobiles. Twin antenna diversity may be applied in the same way as for the uplink except that; (a) this is less convenient for the mobile than for the base station; and, (b) there are fewer sources of interference (typically two base stations in the worst case). In this case the order of 'interferer' diversity is not so effectively increased although the order of wanted signal diversity is satisfactorily doubled.

The 'down-link' affords the possibility of using a common spread spectrum pilot for all mobiles. This would cover the whole bandwidth of all frequency hopped channels and be interleaved with the hops, i.e. it would be sent once per hop. Because this is not sent in the same bandwidth as the individual hop bands it is not generally possible to use this pilot to obtain absolute phase reference (this would require knowledge of absolute delay with a resolution better than $1/16$F for ±22.5 degrees accuracy where F is the signal bandwidth-63 ns for 1 MHz bandwidth). However, it could be used to determine the relative phase and amplitudes between the signals on the two antennas for coherent maximal ratio combining prior to de-modulation. Alternatively, the modulation format on the down link could be identical to that on the uplink. Improvements could be obtained by exploiting the fact that transmissions are (or could be) made on all frequencies on the 'down-link' simultaneously. Thus there would always be a transmission to someone on any given frequency. By examining all frequencies simultaneously it would be possible to use time averaging and possibly frequency averaging as well to obtain a reduced noise phase estimate from the first symbol transmission on every hopped frequency on every hop. This would be very complicated but would have the advantage that it could would allow the use of BPSK rather than DBPSK and enhanced performance thereby.

For variable bit rate services it would be possible to use different bandwidths for different users to provide flexible operation. However, if the system was designed for around the maximum bit/hop rate at which multipath equalisation was not necessary, higher bit rates would require equalisation. This implies the need for a training sequence which would create an unacceptable overhead at or near the proposed hop sizes (a few bits per hop only). Thus, when moving to higher bit rates it would be necessary to include a large step to a size suitable for efficient inclusion of a training sequence (around one hundred bits per hop). This higher bit rate would not match the waveforms applicable for the normal bit rates so that the pre and post cursors of the lower bit rate signals would cause some interference with the high bit rate users. This would result in some loss in capacity but this may be justifiable in the light of the improved flexibility.

Additional capacity may be afforded to single users by the provision of contemporaneous multiple frequency hopping sequences, one sequence for each frequency band or channel. Unless special provision is made, this would lead to a multiplication of complexity by a factor equal to the number of sequences. The complexity can however, be reduced if the hopping sequences are arranged so that corresponding contemporaneous hops of the sequences occupy a corresponding number of adjacent frequency bands or channels. If this is done then each hop comprises adjacent frequency bands or channels which can be processed together and subject to a common frequency hopped up conversion/down conversion procedure. Since the need for a large number of fast frequency hopping oscillator(s) is obviated, which would otherwise have contributed significantly to the processing load, this reduction in complexity affords a significant benefit.

One embodiment of the invention will now be described with reference to the accompanying drawings in which.

Figure 1:
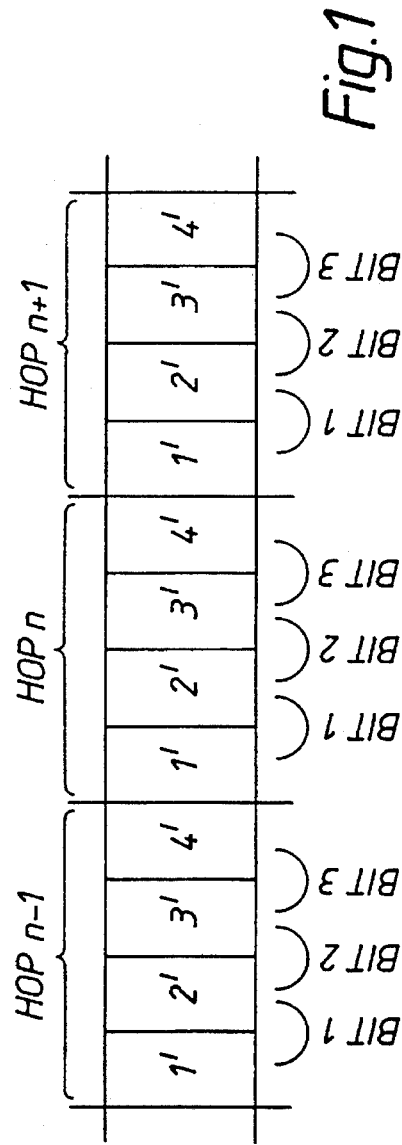
FIG. 1 is a diagram showing a frame structure.

In an exemplary system a symbol dwell duration is 40 usecs with four symbols numbered 1' to 4' per hop, a hop dwell is 160 usecs, the number of bits per hop is 3 and the frame structure is as shown in FIG. 1.

A half rate convolutional code with constraint length 9 is applied over the data which is interleaved over 48 hops corresponding to a frame size of 7.68 ms. This leads to a bit rate per frame of $$\frac{48 \times 3}{2} - 8 = 64 \text{ bits.}$$

The bit rate to the user is then $$\frac{64}{7.68} = 8.33 \text{ kbps.}$$

Simulations of the 'up-link' indicate that about 0.1% BER can be achieved for this system which is generally considered acceptable. This leads to a spectral efficiency of 0.333 bps/Hz cell.

Considering now system implementation, the modulation format requires frequency hop dwells which extend before and after the nominal data transmission period. In a conventional implementation this would require four synthesisers: one tuned to the post cursor of the last frequency; one tuned to the frequency of the current data transmission; one tuned to the pre cursor of the next frequency; and one re-tuning to the next but one frequency (except in the case of numerically controlled oscillators which can re-tune instantly).

Whilst this could be implemented, the preferred solution would be the use of direct digital synthesis or inverse fourier transform signal synthesis. Although with current technology the dynamic range of fully digital implementations is limited this is not expected to be a problem, because the use of power control restricts the dynamic range applicable at any given time. Thus the principle would be to synthesise the entire frequency hopped spectrum directly. This would then be filtered (to reduce spurious signal components out of band) and frequency translated to the RF frequency for transmission. The inverse process would be performed in the receiver, and an example modulator is shown in FIG. 2.

Figure 2:
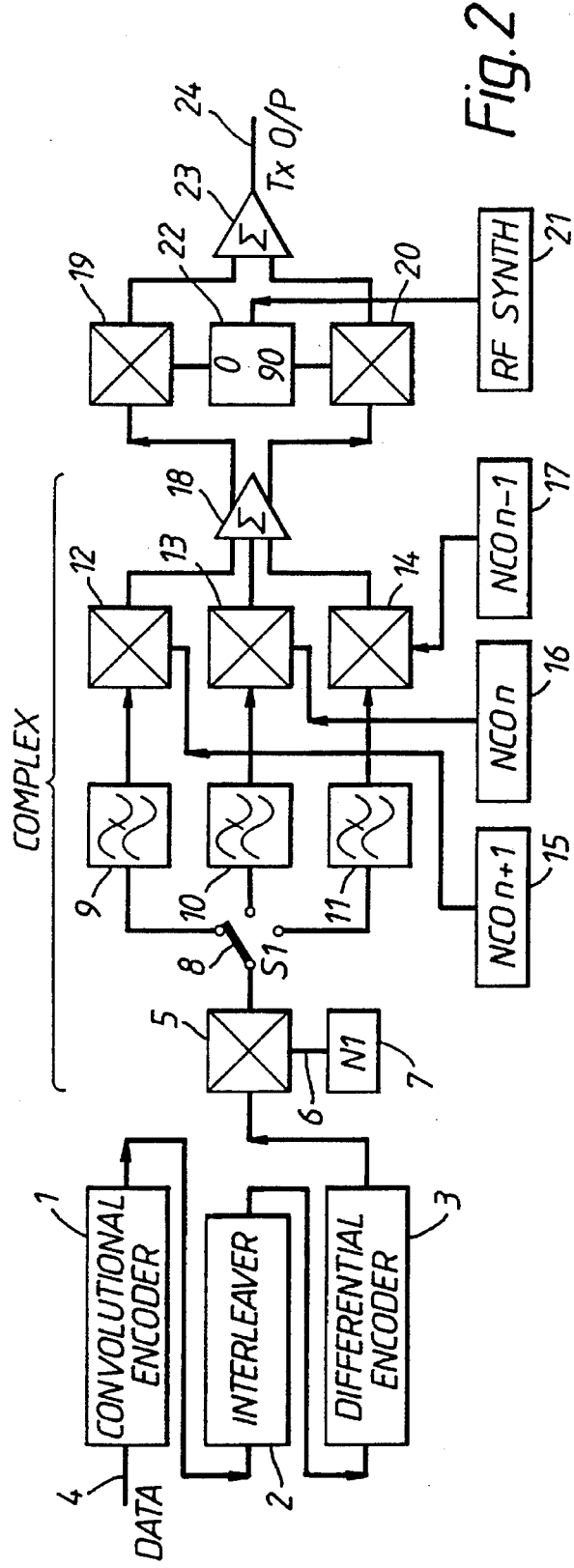
FIG. 2 is a block schematic diagram of a modulator.

Referring now to FIG. 2, a modulator comprises a convolutional encoder 1, an interleaver 2 and a differential encoder 3. Data fed to the modulator on a line 4 is first convolutional encoded and then interleaved and differentially encoded (for DPSK) before randomisation with a QPSK signal N1, which is fed to a mixer 5 via a line 1 from a generator 7. From hereon in the signal processing the signal is complex and therefore comprises I and Q signals. The complex I and Q signal is fed to a switch 8 via which one of three complex low pass Nyquist filters 9, 10 or 11 is supplied in accordance with the position of the switch 8. The filters 9, 10 and 11 are arranged to feed mixers 12, 13 and 14 respectively, the mixers 12, 13 and 14 being fed from local oscillators 15, 16 and 17 which are numerically controlled to produce a signal the frequency of which corresponds to a required hopped frequency. Output signals from the mixers 12, 13 and 14 are fed to a combiner 18, which is arranged to feed a pair of mixers 19 and 20. The mixers 19 and 20 are fed from a frequency synthesiser 21 via a quadrature device 22, whereby the local oscillator signals applied from the quadrature device to the mixers 19 and 20 are in phase quadrature as required to process the I and Q signals. Upconverted signals from the mixers 19 and 20 are fed via a combining amplifier 23 to a transmitter output line 24. It will be appreciated that as many stages of upconversion as required would be provided, although one stage only comprising the mixers 19 and 20 is shown in FIG. 2. Only three numerically controlled oscillators 15, 16 and 17 are required since as hereinbefore mentioned they can be returned substantially instantly. It will be appreciated that the signals applied to the three numerically controlled oscillators are cycled rotationally.

De-modulation is effected essentially as the inverse of the operation just before described for modulation with reference to FIG. 1. Referring now to FIG. 2, a de-modulator comprises a pair of receive aerials 25 and 26. It will be appreciated that two aerials are provided to facilitate space diversity operation. The aerials 25 and 26 are arranged to feed front end amplifiers 27 and 28 which in turn are arranged to feed signal splitters 29 and 30 respectively. The signal splitter 29 is arranged to feed a pair of mixers 31 and 32 which are fed with a local oscillator signal from a frequency synthesiser 33 via a phase quadrature device 34 required to produce phase quadrature related signals for the mixers 31 and 32. I and Q signals from the mixers 31 and 32 are fed to a complex signal combiner 35 to produce a complex signal on a line 36. The signal on the line 36 is split by a divider 37 and fed to three mixers 38, 39 and 40, which are fed from local oscillator signal generators 41, 42 and 43 respectively, to provide output signals for complex low pass Nyquist filters 44, 45 and 46. It will be appreciated that the local oscillators 41, 42 and 43 are switched under numerical control in accordance with the frequency hopping sequence to provide output signals from the Nyquist filters 44, 45 or 46 as appropriate, which are fed to a synchronously operated switch 47 which is arranged to feed a mixer 48 which is fed with a QPSK signal on a line 49 from a generator 50. An output signal from the mixer 48 is fed to a DPSK de-modulator 51 to produce a de-modulated output signal on line 52.

Figure 3:
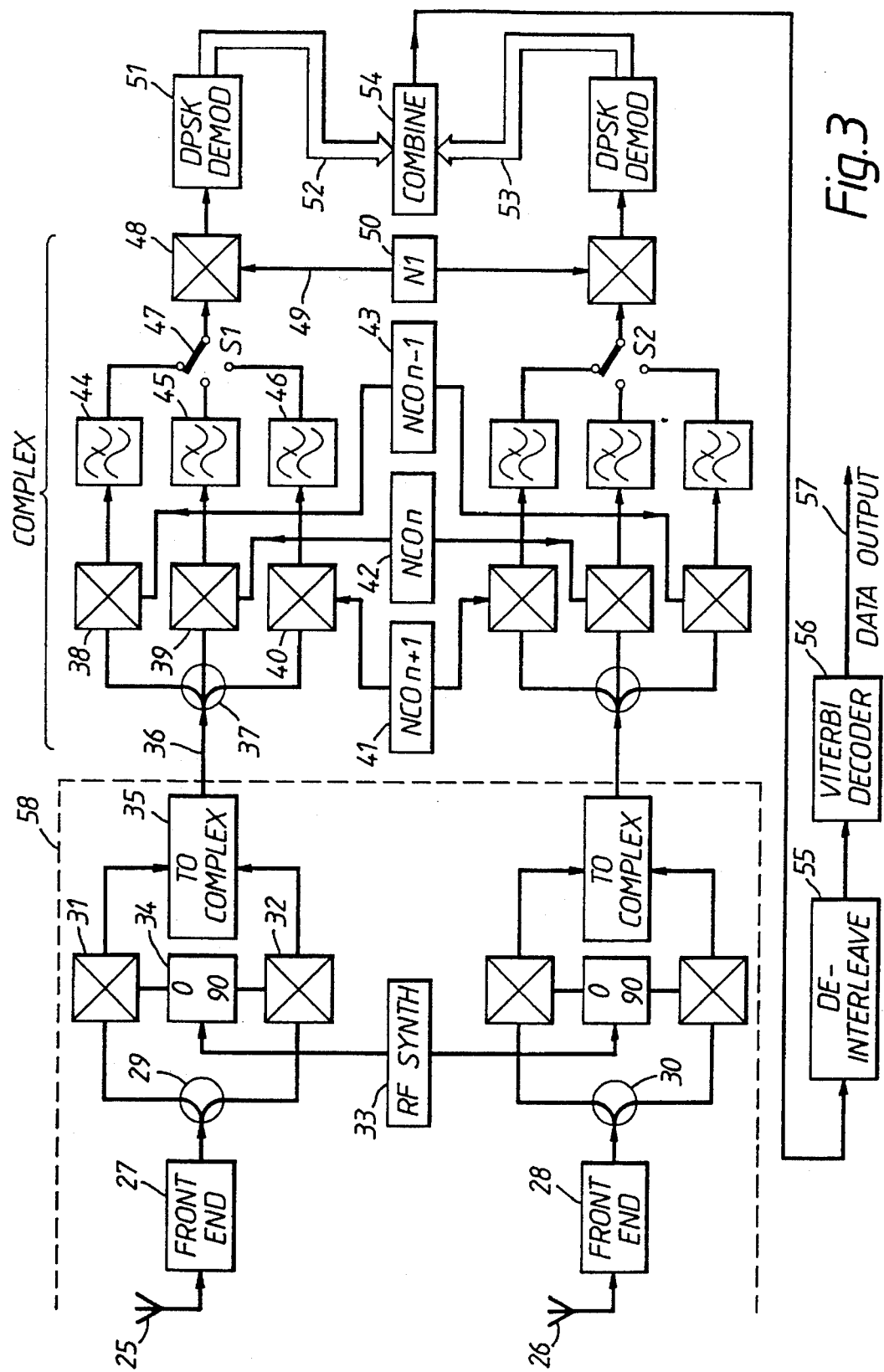
FIG. 3 is a block schematic diagram of a de-modulator.

As can be seen from FIG. 3 the signals received by the aerial 26 are processed by similar apparatus to the signals received by aerial 25 to produce an output signal on a line 53 which corresponds to the signal on the line 52. The signals on the line 52 and 53 are fed to a diversity combiner 54 which may take any known form and from there they are fed via a de-interleaver 55 and a viterbi decoder 56 to produce an output signal on a line 57.

It will be appreciated that a multiplicity of channels are required to handle all of the mobiles, but the hardware to the left of the broken line 58 will be common to all mobiles. In a base station a fast fourier transform (FFT) implementation of the complex hardware will undoubtly be more efficient and therefore preferable. However, this is not shown here since the principles of system operation would not be so clear.

I claim:

1. A frequency hopped cellular mobile radio system, comprising a plurality of base stations each affording a cell within which communication is facilitated with a plurality of mobile units, each of which mobile units is free to move from cell to cell, the system further comprising:

synchronization means for bringing all mobile units within a cell into synchronization, as observed from the base station of that cell, whereby orthogonal frequency hopping between mobile units of the cell is facilitated, frequency hopping between mobile units in different cells being non-orthogonal;

frequency hopping means wherein the number of bits per hop is limited to less than ten bits per hop;

Nyquist signal filtering means effective to constrain interference between hops both in the time domain and in the frequency domain, hopped dwells being extended in time beyond a nominal bit transmission period, before and after the period, to the overlap the nominal bit transmission periods of adjacent hops;

de-correlation means including differential phase shift keying (DPSK) modulation means combined with pseudorandomized quadrature phase shift keying (QPSK) modulation means, arranged to overlay said QPSK modulation on said DPSK modulation to de-correlate interference between cells; and means for error control coding.

2. A system as claimed in claim 1, wherein said means for error control coding comprises interleaving means, whereby adjacent bits are transmitted in different hops, and forward error correction coding means.

3. A system as claimed in claim 2, including power control means in a 'down-link' wherein the power of transmitted base station signals is controlled in dependence upon the signal/noise ratio of signals received from a mobile unit.

4. A system is claimed in claim 3, where the 'down-link' power control arrangement is effected using a spread spectrum pilot which is time division multiplexed with data at a rate of one insertion per hop.

5. A system as claimed in claim 1, wherein said means providing error control coding utilizes Reed Solomon Coding, which is applied so that one symbol of the Reed Solomon Coding corresponds exactly to one hop dwell.

6. A system as claimed in any preceding claim, wherein some of said mobile units are arranged to operate with wider bandwidth hopping than others of said mobile units, whereby mixed bandwidth services are provided.

7. A system as claimed in any of the preceding claims 1–5, wherein some of said mobile units are arranged to operate using several frequency hopping sequences contemporaneously and wherein corresponding contemporaneous hops of the sequences occupy a corresponding number of adjacent frequency bands or channels.

\* \* \* \* \*